United States Patent [19]

Reintjes et al.

[11] Patent Number: 5,278,845
[45] Date of Patent: Jan. 11, 1994

[54] TELETEXT DECODER WITH ERROR DETECTION AND CORRECTION

[75] Inventors: Gerardus J. G. Reintjes; Henricus A. W. van Gestel, both of Eindhoven, Netherlands

[73] Assignee: U.S. Philips Corporation, New York, N.Y.

[21] Appl. No.: 710,267

[22] Filed: Jun. 4, 1991

[30] Foreign Application Priority Data

Jun. 8, 1990 [NL] Netherlands .......................... 9001296

[51] Int. Cl.⁵ .............................................. G06F 11/08
[52] U.S. Cl. .................................... 371/37.1; 371/37.7
[58] Field of Search ....................... 371/37.1, 37.7, 53, 371/54, 38.1

[56] References Cited

U.S. PATENT DOCUMENTS 3,675,200  7/1972  Bossen et al. ...................... 371/37.7
4,276,647  6/1981  Thacker et al. ...................... 371/40

FOREIGN PATENT DOCUMENTS 1040019   8/1966  France .
1169687  11/1969  United Kingdom .......... G06F 11/08

OTHER PUBLICATIONS

*Optical Disk Error Correction* by Solomon W. Golomb, Byte Magazine May 1986, pp. 203, 204, 206, 208 and 210.

"Error Control Coding Fundamentals and Applications", by Shu Lin, University of Hawaii/Texas A&M University and Daniel J. Costello, Jr., Illinois Institute of Technology, Prentice-Hall, Inc., Englewood Cliffs, N.J. 07632, pp. 102-110.

"Teletext and Viewdata" by Steve A. Money, Newnes Technical Book, Kent, England, pp. 34-45.

Primary Examiner—Vincent P. Canney
Attorney, Agent, or Firm—David Schreiber

[57] ABSTRACT

Teletext decoder including an error detection and correction circuit in which the detection and correction of bit errors is effected in a serially manner in Hamming bytes. The teletext decoder includes selection means for selecting predetermined bits from the received bytes, modulo-2 accumulators for generating a syndrome word which indicates the presence and position of bit errors, decoding means for generating a correction value and correction means for correcting faulty data bits during the serial transfer. The error detection and correction circuit can also be used with other data communication systems as well as with digital storage means.

15 Claims, 4 Drawing Sheets

TELETEXT DECODER WITH ERROR DETECTION AND CORRECTION

FIELD OF THE INVENTION

The invention relates to a teletext decoder, comprising means for receiving a serial data signal comprising n-bit code sequences having k data bits and n-k protection bits, an error detection and correction circuit to which the data signal is applied and which is arranged for generating a corrected data signal at the occurrence of bit errors in the data signal, a page acquisition and memory circuit arranged for selecting teletext information from the corrected data signal and for storing this information, and a display circuit for displaying the stored teletext information. The invention also relates to an error detection and correction circuit for correcting bit errors which may occur on reception of a serial data signal comprising code sequences of k data bits and n-k protection bits. Such a circuit can, for example, be used with data communication systems and also with digital storage means.

BACKGROUND OF THE INVENTION

A teletext decoder of the type defined in the opening paragraph is described in Steve A. Money, Teletext and Viewdata, Butterworth & Co Ltd, 1979, pages 35–45. In teletext transmission it is customary to protect a portion of the teletext information from transmission errors by adding a (n-k)-bit Hamming code to k data bits by means of Hamming coding. This provides n-bit code sequences in which the occurrence of one bit error can be corrected and the occurrence of two bit errors can be detected. To that end the error detection and correction circuit of the known teletext decoder is preceded by a series-parallel converter in order to enable the simultaneous processing of the n-bits of a received code sequence. In the prior art circuit predetermined bits of the code sequence are simultaneously applied to as many (n-k)parallel modulo-2 adders as there are protection bits in a code sequence. For that purpose the predetermined bits are branched off by means of a wiring network from the corresponding output of the series-parallel converter. The outputs of the modulo-2 adders form a (n-k)-bit syndrome word which indicates the presence and position of a bit error in an encoded form. The syndrome word is decoded by a network which in response thereto generates a parallel k-bit correction signal whose individual bits are applied in parallel to k exclusive-OR gates. These exclusive-OR gates, denoted controlled inverters in the sequence of this description, each receive a data bit from the series-parallel converter and thereafter apply possibly inverted data bits to the page acquisition and page memory circuit of the teletext decoder.

With the prior art teletext decoder the corrected data bits are processed in parallel. This processing operation includes inter alia the storage of teletext information in a memory which for that purpose is in the form of a 8-bit wide static memory. However, in contemporary teletext decoders, for reasons of cost price, the use of 1-bit wide dynamic memories is preferred. Moreover it is useful to incorporate a teletext decoder in two integrated circuits (IC's), an acquisition IC and a display IC with integrated memory, the latter IC optionally being separately suitable for the display of so-called On-Screen-Display images. With such a split-up of the teletext decoder a lowest possible amount of parallel connection wires between the two IC's is the aim. Consequently, it is advisable to convey the data signal serially again after error correction. It is then inconvenient to use, only for the purpose of error detection and correction, series-parallel conversion and to serialize thereafter the corrected data. Furthermore the error detection and correction circuit in the prior art teletext decoder is fully structured as a combinatorial network, which has the disadvantage that on integration in an IC a relatively large portion of the chip surface is occupied by the large number of parallel connection conductors which require much space. The previously mentioned wiring network in particularly was found to occupy much space.

SUMMARY OF THE INVENTION

The invention has for its object to provide a teletext decoder having a simple error detection and correction circuit with a serial data input and a likewise serial output and which does not have the above disadvantages and objections.

According to an embodiment of the invention, the error detection and correction circuit in the teletext decoder therefore comprises selection means for selecting in response to selection signals generated by a pulse generator n-k serial sub-sequences which include predetermined bits of the code sequences, detection means for generating a (n-k) bit syndrome word which indicates the presence and position of bit errors, these detection means comprising n-k modulo-2 accumulators, each receiving a sub-sequence, decoding means arranged for generating during at least one predetermined bit period a correction value in response to the syndrome word applied, as well as correction means comprising a series arrangement of delay elements and at least one controlled inverter, the serially occurring bit of the code sequences being applied to the series arrangement which is arranged for correcting in accordance with the correction value during the at least one predetermined bit period a bit of the code sequence applied to the inverter. Modulo-2 accumulators must here be understood to mean 1-bit accumulators in which an applied bit is added modulo-2 to the content of the accumulator. The measures in accordance with the invention achieve that the detection of faulty data bits and the correction thereof is effected during the serial transfer of the teletext signal from input to output. Both series-parallel conversion in advance and parallel-series conversion afterwards can be omitted. This does not only reduce the number of logic components, in practice the absence of wide parallel connection conductors provide a saving in chip surface. Such a saving is relevant for the yield in large scale production of teletext IC's. The serial detection and correction circuit requires a higher on-chip, processing rate but this will not be ojectionable in the IC-technology in the near future.

It should be noted that it is known per se from the U.S. Pat. No. 4,276,647 to select subsequences by means of selection means and to apply these sequences to modulo-2 accumulators with the object of serially structuring of the syndrome word. In this circuit, which is intended for the detection and correction of error bursts, recovering the associated protection bits from the received data bits is first realized, which are thereafter compared with the actually received protection bits. The data bits are, however, also converted into a parallel word format and applied to a processor for later correction. After reception of a complete code sequence the syndrome word thus obtained is stored in a register which is accessible to the processor and the correction is effected on the parallel words.

It should further be noted that in Lin et al: Error Control Coding Fundamentals and Applications, Prentice-Hall, 1983, pages 104-106 an error detection and correction circuit is described in which both the detection and the correction of bit errors is effected serially. The article relates to a cyclic detector which can only be used for what are commonly denoted cyclic codes (a cyclic code is obtained when a valid code sequence again represents a valid code sequence after a cyclic shift). With the cyclic detector the syndrome word is formed by shifting the received n-bit code sequence in a fed-back (n-k)-bit syndrome register. At the same time the code sequences are shifted in a buffer store with the object of being delayed for n-bitperiods. The cyclic detector has the attractive property that the bits are also shifted serially from the buffer register, an error bit being corrected as soon as it leaves the buffer register. The cyclic detector is however not suitable for the non-cyclic codes used in teletext. In addition, the cyclic detector is not arranged for processing the uninterrupted code sequences customary in teletext; after reception of a code sequence no new code sequence must be entered into the syndrome register as long as the preceding code sequence has not yet left the buffer store.

An advantageous embodiment of the teletext decoder, is characterized, in that the consecutive delay elements are coupled by means of controlled inverters, the decoding means having been arranged for applying simultaneously to each inverter a bit of the correction value during the predetermined bit period. This achieves that the correction is effected during the same bit period as that in which the syndrome word is obtained so that the syndrome words need not to be additionally stored for later usage. An optimum embodiment is obtained when the correction means comprise k delay elements, each delay element receiving an enable signal generated by the pulse generator for transferring only the data bits of the data signal. This embodiment has the advantage that a delay element is only required for the k data bits of a code sequence. This is more specifically advantageous in that case in which the number of protection bits in a code sequence is not significantly less than the number of data bits. This is, for example, the case with teletext decoders in which the code sequences generally comprise four data bits and four protection bits. In addition, the serial output signal no longer contains the now superfluous protection bits.

DETAILED DESCRIPTION OF THE PREFERRED EMBODIMENTS

Figure 1:
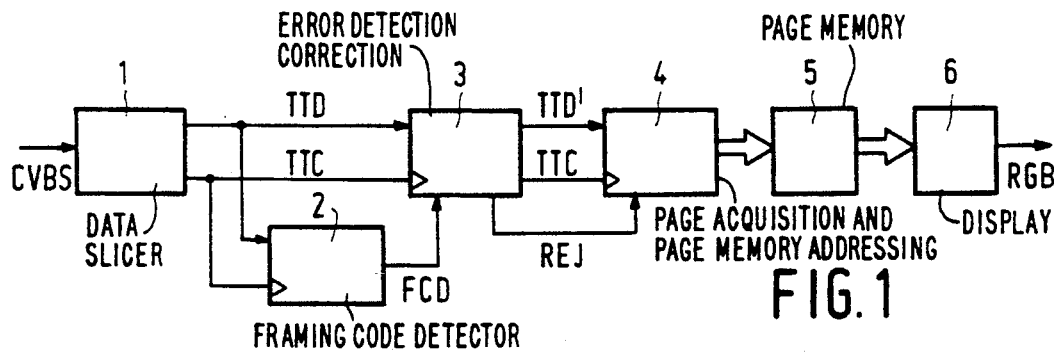
FIG. 1 shows the general structure of a teletext decoder in accordance with an embodiment of the invention.

FIG. 1 shows the general structure of a teletext decoder in accordance with the invention. A composite video signal CVBS is applied to a data slicer 1 which in known manner regenerates a serial data signal TTD and an associated clock signal TTC from picture lines containing teletext information. The data signal TTD is applied to a framing code detector 2 which examines the data signal for the presence of a code sequence having a predetermined value which renders it possible to distinguish the further code sequences in the data signal. In teletext this code sequence is designated "framing code", it comprises eight bits having the value 11100100. On detection of the frame code the framing code detector 2 generates a framing code detection signal FCD in response thereto. The data signal TTD is then also applied to an error detection and correction circuit 3 still to be described hereinafter. The error detection and correction circuit 3 further receives the framing code detection signal FCD and applies an output signal TTD' to a page acquisition and page memory addressing circuit 4. In addition, circuit 3 supplies a reject signal REJ which indicates whether the output signal TTD' is reliable and can be accepted by circuit 4. The page acquisition and memory addressing circuit 4 further stores in known manner the information of a selected teletext page in a page memory 5. A display circuit 6 reads the page memory and converts the stored information into a signal RGB for display of the teletext page on a picture screen (not shown).

Figure 2:
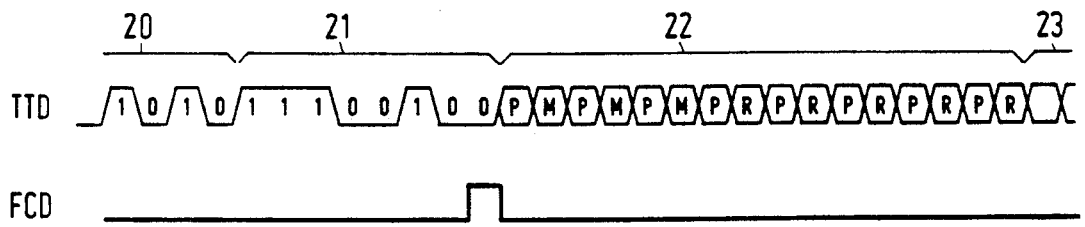
FIG. 2 shows timing diagrams to explain the operation of the teletext decoder shown in FIG. 1.

The received data signal is denoted in FIG. 2 by TTD. The consecutive code sequences each comprise 8 bits and are called bytes hereinafter. The data signal TTD contains two so-called "clock-run-in" bytes 20 which are only shown partly, the framing code 21, a two-byte word 22 which contains a magazine and row number, as well as forty further bytes 23 of which only some bits are shown. The magazine number comprises three data bits denoted by M, the row number comprises five data bits denoted by R. The two bytes of word 22 are both protected from the occurrence of transmission errors by means of four protection bits denoted by P. The protection of the forty further bytes 23 depends on their function and is related to the row number. If, for example, the row number is 0 then the first eight of these further bytes are also protected by means of four protection bits. If the row number is 27 each of the forty further bytes is then protected by four protection bits. If the row number is 1-25 then each of the further bytes only contains one single parity bit and no correction of bit errors is possible. In FIG. 2 the framing code detection signal is denoted by FCD. This signal marks the reception of the framing code 21 and enables byte synchrinization.

Figure 3:
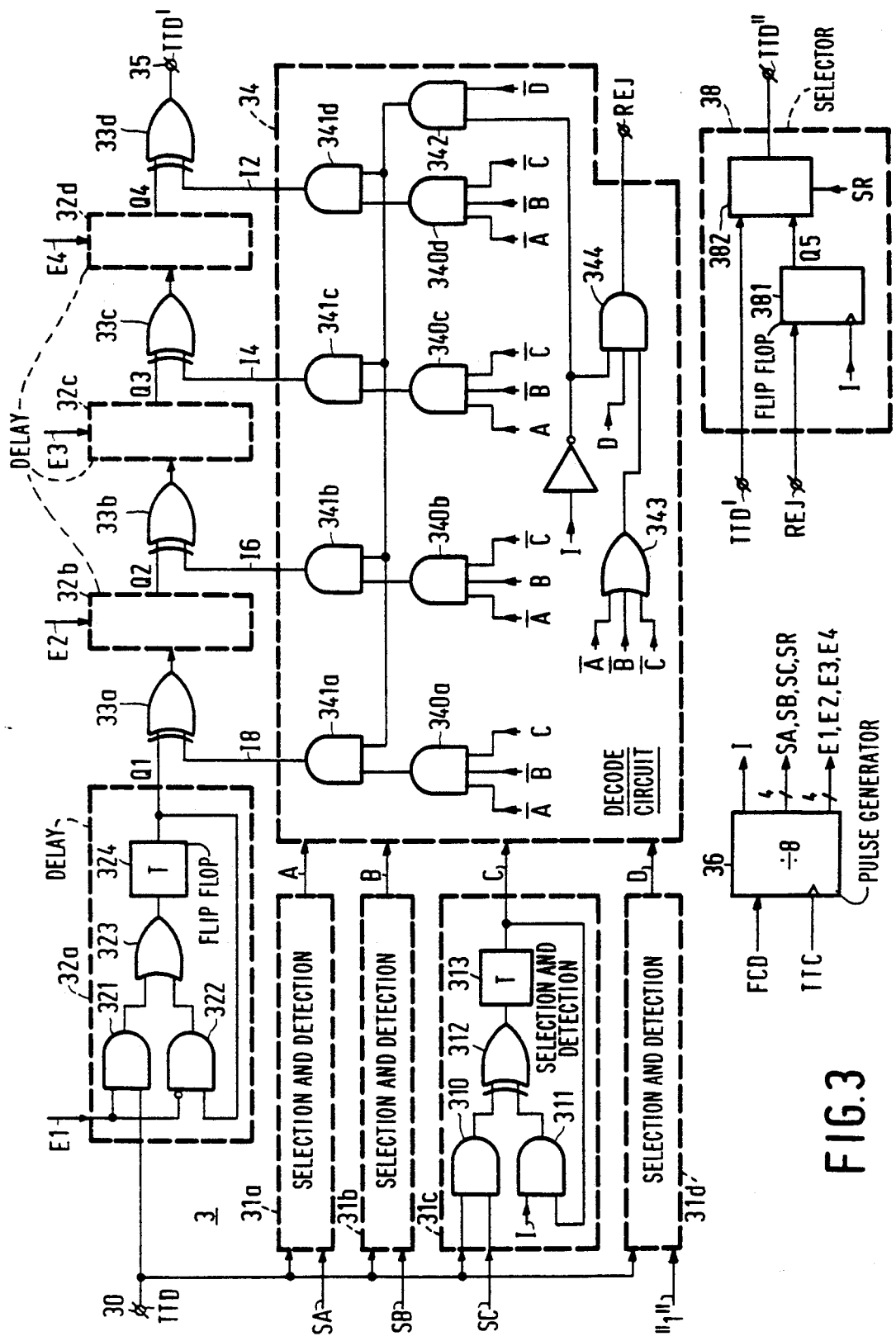
FIG. 3 shows an embodiment of an error detection and correction circuit shown in FIG. 1.

FIG. 3 shows an embodiment of the error detection and correction circuit 3. The data signal TTD is received at an input terminal 30 and is simultaneously applied to four identical selection and detection channels 31a . . . 31d. Furthermore the data signal is applied to a correction circuit constituted by a series arrangement of four identical delay elements 32a . . . 32d and four controlled inverters 33a . . . 33d. The four selection and detection channels 31a . . . 31d each have a respective binary output A . . . D, which together form a syndrome word. This syndrome word is applied to a decoding circuit 34 which in response thereto generates a correction value. This correction value comprises four bits I8, I6, I4, and I2 which in this embodiment occur in parallel and are each applied to an input of the controlled inverters 33a . . . 33d. The output signal TTD' of controlled inverter 33d is applied to an output terminal 35.

In addition, the circuit includes a pulse generator 36. This generator receives the framing code detection signal FCD and in response thereto assumes a predetermined position. Thereafter the pulse generator divides the clock signal TTC received by eight. By decoding the eight counting position thus obtained several timing signals are obtained: an initialization signal I, four selection signals SA, SB, SC, SR and four enable signals E1, E2, E3 and E4. These signals will be discussed in detail with reference to FIG. 4.

Figure 4:
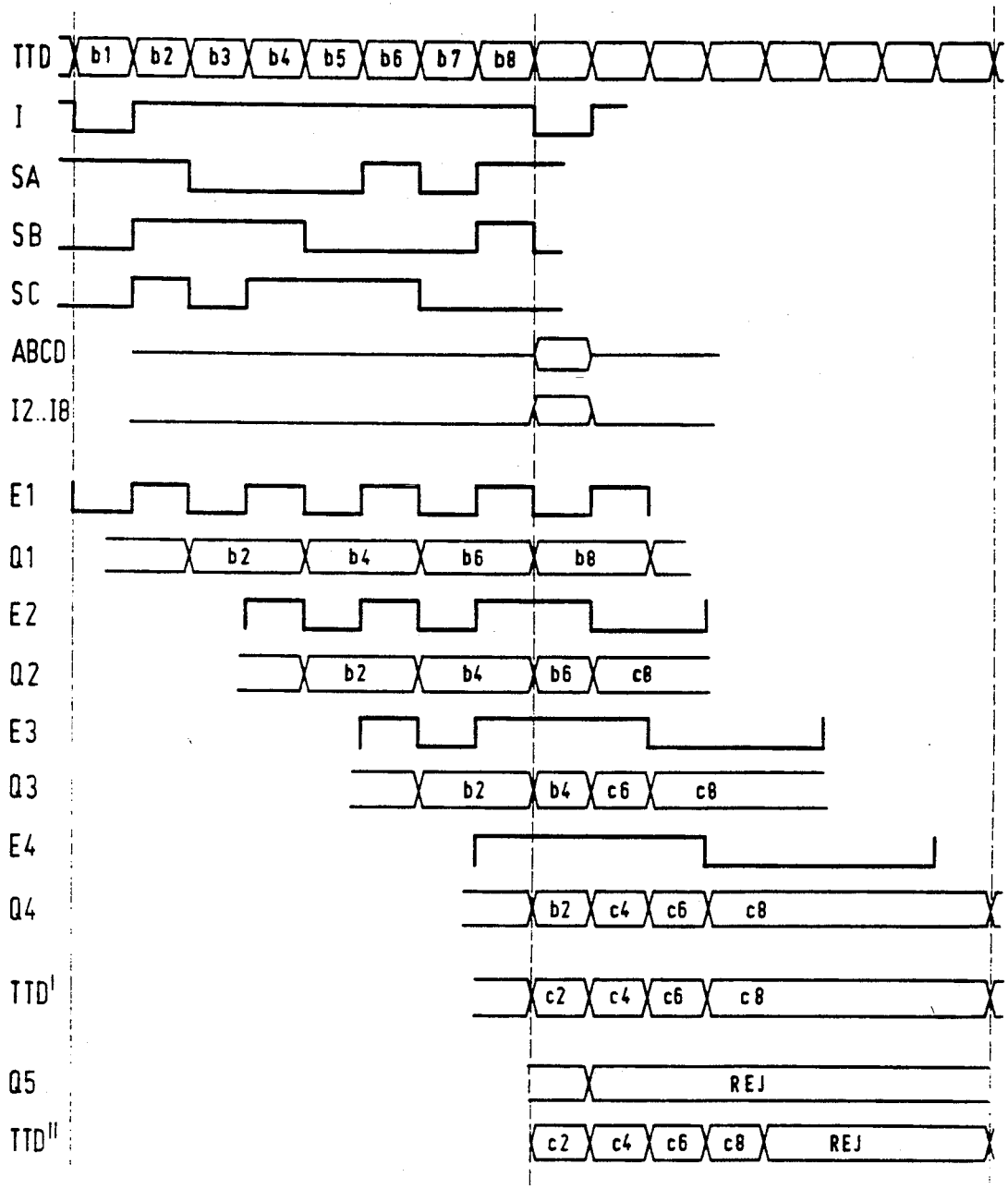
FIG. 4 shows timing diagrams to explain the operation of the error detection and correction circuit shown in FIG. 3.

FIG. 4 shows timing diagrams to explain the operation of the error detection and correction circuit 3. In FIG. 4 TTD denotes the data signal in which the eight bits of a byte are denoted by b1 . . . b8. In accordance with the customary teletext coding it is assumed that b2, b4, b6 and b8 are data bits, while b1, b3, b5 and b7 represent protection bits. The remaining signals shown in FIG. 4 will be described hereafter.

Each of the four selection and detection channels 31a . . . 31d, FIG. 3 is arranged to determine the modulo-2 sum of a number of predetermined bits of a bytes. Thus, channel 31c is arranged to determine the modulo-2 sum of the data bits b2, b4, b6 and the protection bit b5. To that end the data signal TTD is applied to the first input of an AND-gate 310 which receives the selection signal SC at a second input. As is denoted in FIG. 4 y SC, this selection signal has the logic value "1" during the bit periods in which the bits b2, b4, b5 and b6 of a byte are received. This provides at the output of the AND-gate 310 a sub-sequence which only contains the bits b2, b4, b5, b6 and at other bit times of that type has the logic value "0". This sub-sequence is applied to a 1-bit modulo-2 adder 313. The second input of this adder 312 is connected to the output, of a further AND-gate 311 to which the initialization signal I is applied as well as the output signal of a flip-flop 313. In FIG. 4 the initialization signal is denoted by I, it has the logic value "0" during the first bit period of a byte and further the logic value "1".

During the first bit period the output of AND gate 311 has the logic value "0" in response to the initialization signal I. The output of AND-gate 310 also has the value "0" in response to the selection signal SC. Adder 312 now receives at both inputs the value "0" and as a result thereof applies the modulo-2 sum "0" to the input of flip-flop 313. This flip-flop is clocked each bit period by the clock signal TTC (not shown). During the remaining bit periods of a byte the initialization signal I has the logic value "1". As a result thereof, after each clock pulse, the modulo-2 sum stored in flip-flop 313 is fed back to the second input of adder 312 via AND-gate 311. The first input of the adder receives either a bit from the sub-sequence (if SC="1") or the value "0"(if SC="0"). It will be obvious that thus the modulo-2 sum of the bits b2, b4, b5 and b6 is determined. After the eighth bit period i.e. during the first bit period of the subsequent byte, the output signal C of channel 31c contains the value (+means modulo-2 sum):

$$C = b2 + b4 + b5 + b6$$

In a similar manner, channel 31b receives the selection signal, denoted by SB in FIG. 4, for forming a subsequence which comprises the data bits b2, b4, b8 and the protection bit b3. Thus, channel 31b supplies an output signal B for which it holds that:

$$B = b2 + b3 + b4 + b8$$

Channel 31a receives the selection signal which in FIG. 4 is denoted by SA. In a similar manner it now holds that:

$$A = b1 + b2 + b6 + b8$$

Channel 31d is arranged to determine the modulo-2 sum of all the bits b1 . . . b8. To that end the selection signal applied has the fixed value "1", so that it holds that:

$$D = b1 + b2 + b3 + b4 + b5 + b6 + b7 + b8$$

For the possible values of A, B, C and D the following teletext standard applies:

TABLE 1

| A | B | C | D | means | action |
|---|---|---|---|-------|--------|
| 1 | 1 | 1 | 1 | 0 errors | accept databits |
| 0 | 0 | 0 | 0 | b2 error | invert b2 |
| 1 | 0 | 0 | 0 | b4 error | invert b4 |
| 0 | 1 | 0 | 0 | b6 error | invert b6 |
| 0 | 0 | 1 | 0 | b8 error | invert b8 |
| 0 | 1 | 1 | 0 | b1 error | |
| 1 | 0 | 1 | 0 | b3 error | accept |
| 1 | 1 | 0 | 0 | b6 error | databits |
| 1 | 1 | 1 | 0 | b7 error | |
| rest | | | 1 | 2 errors | reject databits |

The four modulo-2 sum values A, B, C and D form a 4-bit syndrome word ABCD which, in accordance with Table 1 indicates whether there are 0, 1 or 2 bit errors in the byte, and if 1 bit error is detected, which bit is incorrect.

In FIG. 4 ABCD indicates that the syndrome word is available during the first bit period of the subsequent byte. The syndrome word ABCD is applied to the decoder circuit 34. This decoder has a series of AND-gates 340a . . . 340d which, in accordance with Table 1, decode whether b8, b6, b4 or b2 respectively must be corrected. The outputs of these AND-gates are connected to first inputs of a further sequence of AND-gates 341a . . . 341d which generate respective bits I8, I6, I4 and I2 of a 4-bit correction value. The second inputs of these further sequences of AND-gates receives a correction enable signal from an AND-gate 342 so that the correction value is only relevant if one bit error (D=0) occurs and if the syndrome word is indeed available, i.e. during the first bit period of a byte (I="0"). As is denoted in FIG. 4 by I2 ... I8 the bits I8, I6, I4 and I2 of the correction value have the logic value "0" during the remaining bit periods. In addition the decoding circuit 34 includes a gate circuit (343, 344) for generating, in accordance with Table 1 a reject signal REJ for the case two bit errors have occurred.

During the assembly of the syndrome word ABCD the data signal TTD is also applied to the correction circuit which is formed by the delay elements 32a . . . 32d and controlled inverters 33a . . . 33d. Each delay element includes a selector (321, 322, 323) and a flip-flop 324 which is clocked by the clock signal TTC (not shown). In response to an enable signal applied, E1, E2, E3 or E4 respectively, the selector determines whether in the delay element the bit applied to the input is transferred (E="1") or the bit already stored in the flipflop is stored again (E="0").

In FIG. 4, E1 designates the enable signal which is applied to the first delay element 32a. It has the logic value "1" during the bit periods in which bits b2, b4, b6 and b8 are received. As is denoted in FIG. 4 by Q1, delay element 32a takes over, in response thereto, the successive data bits b2, b4, b6 and b8 of the data signal TTD. It then holds that during the first bit period of the subsequent byte bit b8 is available at the output. The output signal Q1 is applied to the controlled inverter 33a. The bit I8 of the correction value I8, applied to the control input of this inverter, has during the first bit period a relevant value and thereafter has constantly the logic value "0". Thus, bit b8 is inverted if correction thereof appeared to be necessary. The possibly corrected bit b8 is denoted in FIG. 4 by c8. The further bits are not influenced by inverter 33a.

In FIG. 4 E2 designates the enable signal which is applied to the second delay element 32b. In response thereto this delay element takes over the data bits b2, b4, b6 and the possibly corrected data bit c8 from inverter 33a. As is denoted in FIG. 4 by Q2 this is effected in such a manner that during the first bit period the data bit b6 is applied to inverter 33b. In response to the bit I6 of the correction value the possibly corrected data bit c6 is thus obtained from data bit b6.

In a similar manner as in FIG. 4, E3 and E4 designate the enable signals for the respective delay elements 32c and 32d. Q3 and Q4 indicate the output signals corresponding thereto of these delay elements. The inverters 33c and 33d may effect, if necessary, the correction of the data bits b4 and b2 in response to the bits I4 and I2 of the correction value. The output signal of the error detection and correction circuit is denoted in FIG. 4 by TTD'.

As is shown in FIG. 4, the output signal TTD' now no longer contains the superfluous protection bits b1, b3, b5 and b7. It should be noted that a person skilled in the art is, if desired, capable of decoding from pulse generator 36 such enable signals E1 . . . E4 that the data bits c2, c4, c6 and c8 each contain two bit periods so as to ensure that the four data bits are uniformly distributed over a byte period. However, this has not been opted for in the embodiment shown. In the embodiment shown, four bit periods are, if so desired, available for inserting other information in the output signal. More specifically, it is useful to insert the logic value of the reject signal REJ in the form of a further bit in the output signal TTD'. As is denoted in FIG. 3 by the reference numeral 38, an extension of the error detection and correction circuit suitable for this purpose includes also a flip-flop 381 and a selector 382. The logic value of the reject signal REJ is entered in the flipflop 381 at the end of the first bit period in response to the initialization signal I applied to the clock input. The output signal of the flipflop (Q5 in FIG. 4) is applied to the selector 382 which further receives the corrected data signal TTD'. A selection signal which in FIGS. 3 and 4 is denoted by SR is applied to the selector by the pulse generator 36. As is denoted in the Figures by TTD" the output signal of selector 382 now successively comprises the four data bits and the logic value of the reject signal REJ.

Figure 5:
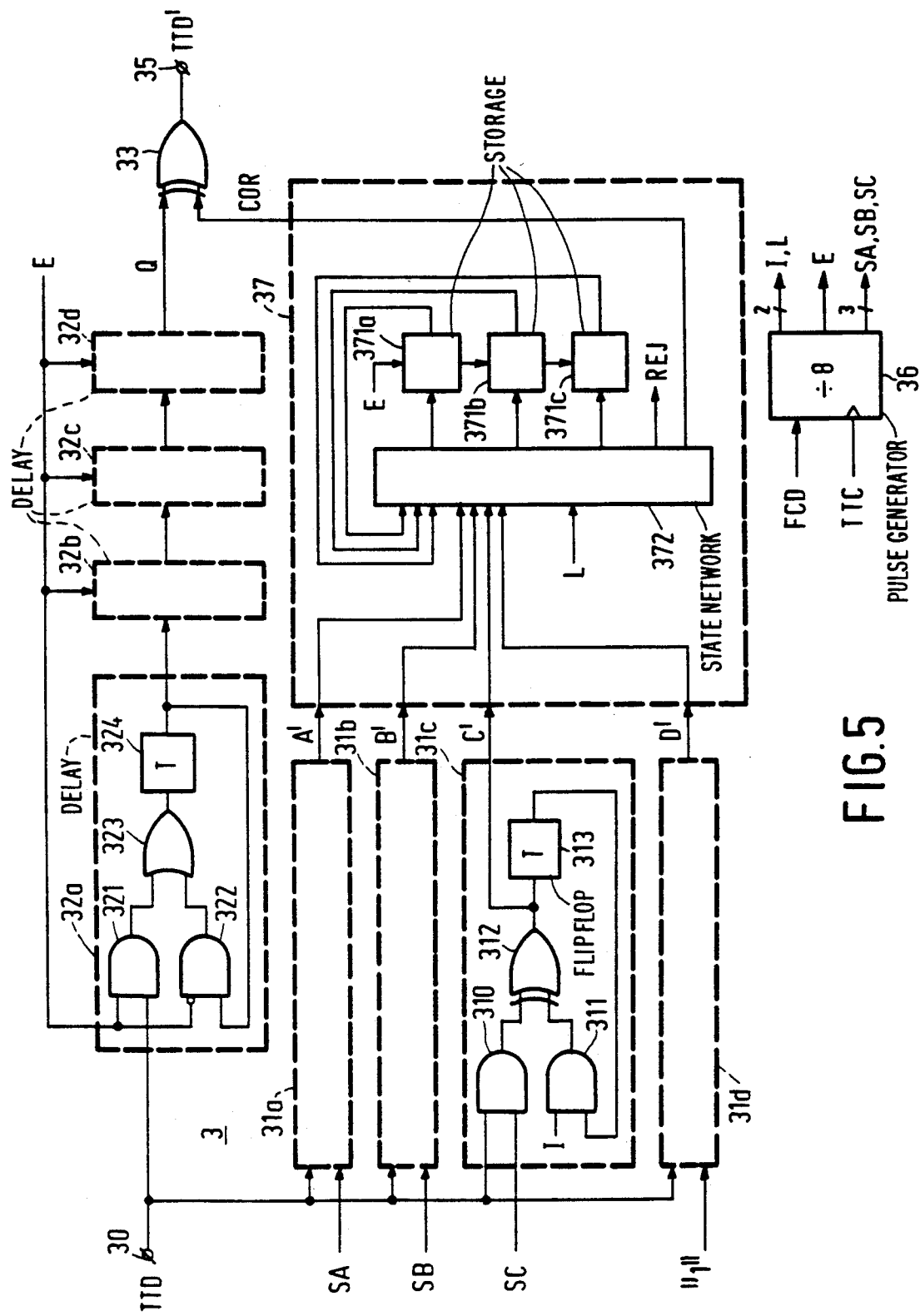
FIG. 5 shows a further embodiment of the error detection and correction circuit used with the decoder of FIG. 1.

FIG. 5 shows a further embodiment of the error detection and correction circuit of FIG. 1. Herein elements corresponding to those in FIG. 3 are given the same reference numerals. In the embodiment illustrated in FIG. 5 the correction circuit is constituted by the delay elements 32a . . . 32d and one controlled inverter 33, which now receives a serial correction signal COR. The delay elements are now directly arranged in series and each receives the same enable signal E. The decoding circuit, which is now denoted by the reference numeral 37, comprises 3 storage elements 371a . . . 371c and a state network 372. These storage elements are of an identical structure as the delay elements 32a . . . 32d and receive the same enable signal E. Their inputs are connected to outputs of the state network 372 and their outputs are fed back to inputs of the state network. In this manner the correction circuit forms a counter which in a predetermined manner assumes successive counting positions in response to the clock signal TTC (not shown). In addition, the state network receives the syndrome word A'B'C'D' which is now taken from the input of flipflops 313. The state network further receives a load signal L and is arranged for adjusting the counter, in response to the load signal, to an initial counting position which is determined by the syndrome word. The enable signal E and the load signal L are generated by a pulse generator 36.

Figure 6:
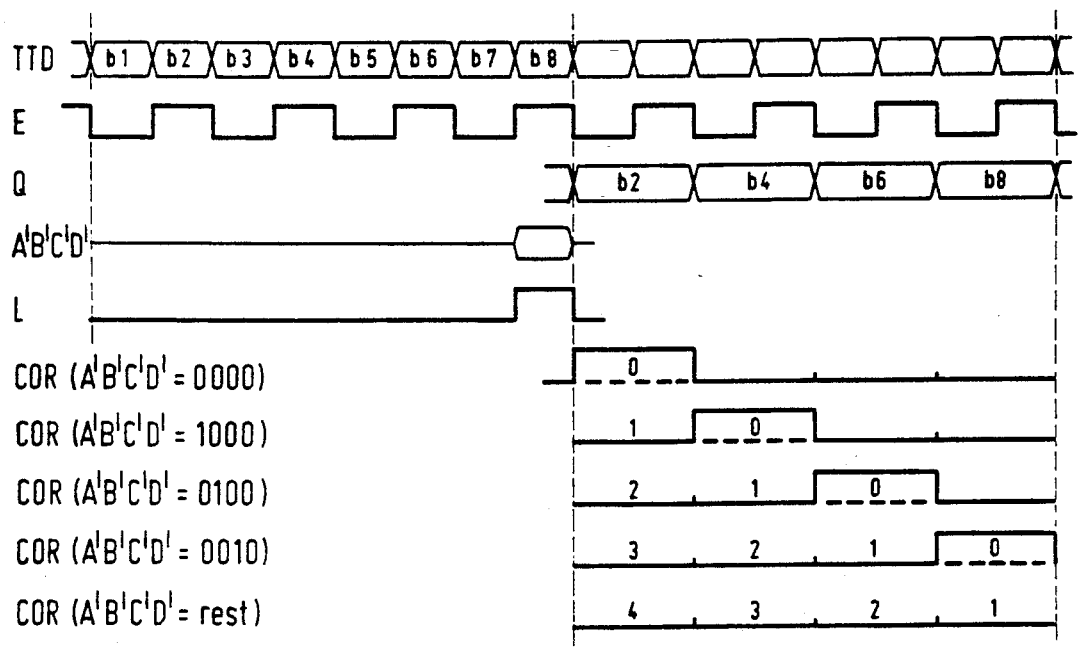
FIG. 6 shows timing diagrams to explain the operation of the error detection and correction circuit of FIG. 5.

FIG. 6 shows timing diagrams to explain the operation of the error detection and correction circuit shown in FIG. 5. The data signal received (TTD in FIG. 6) is delayed for eight bit periods by the delay elements 32a . . . 32d, the protection bits b1, b3, b5 and b7 then being suppressed in response to the enable signal denoted by E. The output signal of the delays applied to the controlled inverter 33 is denoted by Q in FIG. 6. During the eight bit periods the syndrome word is assembled in the manner already described in the foregoing. Since now the syndrome word is taken from the input of flipflop 313 it reaches its relevant value during the last bit period of the relevant code sequence as is designated in FIG. 6 by A'B'C'D'. During this eighth bit period the load signal (L in FIG. 6) is energized and the storage elements 371a . . . 371c are adjusted to an initial counting position which corresponds to the value of the syndrome word A'B'C'D'.

TABLE 2

| A' | B' | C' | D' | initial counting position |
|---|---|---|---|---|
| 0 | 0 | 0 | 0 | 0 |
| 1 | 0 | 0 | 0 | 1 |
| 0 | 1 | 0 | 0 | 2 |
| 0 | 0 | 1 | 0 | 3 |
| rest | | | | 4 |

Thereafter the counter decrements the counting position by 1 at every second clock pulse of the clock signal TTC (the remaining clock pulses have no effect because of the enable signal E='0'). During the counting position 0 the logic value '1' is then generated for the correction signal COR. In FIG. 6 it is shown for the four relevant prevailing cases (error in data bit b2, b4, b6 or b8) that this counting position 0 occurs during outputting of the relevant data bit. For the case in which the syndrome word indicates that no bit error has occurred, two bit errors have been detected or a protection bit is incorrect, counting position 0 does not occur and no correction takes place.

What is claimed is:

1. A teletext decoder, comprising:
means for receiving a serial data signal comprising n-bit code sequences having k data bits and n-k protection bits,
error detection and correction means to which the data signal is applied arranged for generating a corrected data signal at the occurrence of bit errors in the data signal.
page acquisition and memory means arranged for selecting teletext information from the corrected data signal and for storing this information,
and a display circuit for displaying the stored teletext information,
said error detection and correction means comprising:
pulse generator means for generating selection signals,
selection means for selecting in response to said selection signals generated by said pulse generator means n-k serial subsequences which include predetermined bits of the code sequences,
detection means for generating a (n-k) bits syndrome work which indicates the presence and position of bit errors and comprising n-k modulo-2 1 accumulators each receiving a sub-sequence,
decoding means arranged for generating during at least one predetermined bit period a correction value in response to the syndrome word applied, and
correction means comparing a series arrangement of delay elements and at least one controlled inverter, the serially occurring bits of the code sequences being applied to the series arrangement arranged for correcting in accordance with the correction value during the at least one predetermined bit period a bit of the code sequence applied to the inverter.

2. A teletext decoder as claimed in claim 1 wherein the output signals of the delay elements are applied to one controlled inverter, the decoding means comprising a counter into which the syndrome word is loaded and which, at each bit period, receives a clock signal and is arranged to apply a 1-bit correction value to the inverter at a predetermined bit period being determined by the syndrome word.

3. A teletext decoder as claimed in claim 1, wherein the successive delay elements are coupled by a corresponding controlled inverter, the decoding means being arranged for applying simultaneously a bit of the correction value to each said corresponding inverter during the predetermined bit period.

4. A teletext decoder as claimed in claim 2, wherein the correction means include k delay elements, each delay element receiving an enable signal generated by the pulse generator for transferring only the data bits of the data signal.

5. A teletext decoder as claimed in claim 4 wherein certain bit errors are non-correctable, the detection means being arranged for generating a reject signal at the occurrence of said non-correctable bit errors, the error detection and correction means being arranged for adding the reject signal to the data bits of the data signal.

6. A teletext decoder claimed in claim 1 wherein an initialization signal generated by the pulse generator is applied to the detection means for initializing the modulo-2 accumulators on reception of the first bit of a code sequence of the data signal.

7. An error detection and correction circuit, comprising:

an input for receiving a serial data signal comprising code sequences of k data bits and n-k protection bits,
selection means for selecting in response to signals generated by a pulse generator n-k serial subsequences each comprising predetermined bits of the code sequence,
detection means for generating an n-k bit syndrome word which indicates the presence and position of bit errors, the means being formed by n-k modulo-2 accumulators each receiving a sub-sequence,
decoding means arranged for generating a correction value in response to the syndrome word applied,
correction means for correcting at least one bit of the data signal in response to the correction value applied, said correction means comprising a series arrangement of successively delay elements and at least one controlled inverter to which series arrangement the serially occurring bits of the code sequence are applied and which is arranged for correcting during the at least one predetermined bit period a bit of the code sequence in accordance with the correction value.

8. An error detection and correction circuit as claimed in claim 7 wherein the delay elements generate an output signal which is applied to one controlled inverter, the decoding means comprising a counter into which the syndrome word is loaded and which at each bit period receives a clock signal and is arranged for applying a 1-bit correction value to the inverter at a predetermined position, the corresponding bit period being determined by the syndrome word.

9. An error detection and correction circuit as claimed in claim 7 wherein the successive delay elements are coupled by means of controlled inverters, the decoding means being arranged for applying simultaneously a bit of the correction value to each inverter during the predetermined bit period.

10. An error detection and correction circuit as claimed in claim 8 wherein the correction means comprise k delay elements each delay element receiving an enable signal generated by the pulse generator for transferring only the data bits of the data signal.

11. An error detection and correction circuit as claimed in claim 10 wherein the detection means is arranged for generating a reject signal at the occurrence of non-correctable bit errors the error detection and correction means being further arranged for adding the reject signal to the data bits of the data signal.

12. A teletext decoder as claimed in claim 3 wherein the correction means include k delay elements, each delay element receiving an enable signal generated by the pulse generator for transferring only the data bits of the data signal.

13. A teletext decoder as claimed in claim 12 wherein certain bits errors are non-correctable, the detection means being arranged for generating a reject signal at the occurrence of non-correctable bit errors, the error detection and correction means being arranged for adding the reject signal to the data bits of the data signal.

14. An error detection and correction circuit as claimed in claim 9 wherein the correction means comprise k delay elements each delay element receiving an enable signal generated by the pulse generator for transferring only the data bits of the data signal.

15. An error detection and correction circuit as claimed in claim 14 wherein the detection means is arranged for generating a reject signal at the occurrence of non-correctable bit errors, the error detection and correction means being further arranged for adding the reject signal to the data bits of the data signal.

* * * * *